United States Patent [19]

Draper et al.

[11] 4,449,376
[45] May 22, 1984

[54] INDOOR UNIT FOR ELECTRIC HEAT PUMP

[75] Inventors: Robert Draper, Churchill; Robert S. Lackey, Pittsburgh; Thomas J. Fagan, Jr., Penn Hills; Stephen E. Veyo, Murrysville, all of Pa.; Joseph R. Humphrey, Grand Rapids, Mich.

[73] Assignee: Westinghouse Electric Corp., Pittsburgh, Pa.

[21] Appl. No.: 468,006

[22] Filed: Feb. 18, 1983

[51] Int. Cl.³ .......................................... F25D 23/12
[52] U.S. Cl. ................................ 62/259.1; 62/298; 62/326; 62/448
[58] Field of Search ............... 62/298, 326, 448, 450, 62/299, 297, 324.1

[56] References Cited

U.S. PATENT DOCUMENTS

| | | | |
|---|---|---|---|
| 3,411,569 | 11/1968 | Hildreth | 62/450 X |
| 3,712,078 | 1/1973 | Maynard | 62/326 X |
| 3,977,467 | 8/1976 | Northrup, Jr. | 62/326 |

*Primary Examiner*—Lloyd L. King
*Attorney, Agent, or Firm*—E. C. Arenz

[57] ABSTRACT

An indoor unit for an electric heat pump is provided in modular form including a refrigeration module 10, an air mover module 12, and a resistance heat package module 14, the refrigeration module including all of the indoor refrigerant circuit components including the compressor 36 in a space adjacent the heat exchanger 28, the modules being adapted to be connected to air flow communication in several different ways as shown in FIGS. 4–7 to accommodate placement of the unit in various orientations.

6 Claims, 9 Drawing Figures

INDOOR UNIT FOR ELECTRIC HEAT PUMP

GOVERNMENT CONTRACT

The Government has rights in this invention pursuant to prime Contract No. W-7405-ENG-26 and Subcontract No. 86X-24712-C awarded by the U.S. Department of Energy.

BACKGROUND OF THE INVENTION

This invention pertains to the construction of an indoor unit for an electric heat pump of a size and character typically usable for residential conditioning.

As is the case in connection with U.S. patent application Ser. No. 461,796, filed Jan. 28, 1983 relating to an outdoor unit for an electric heat pump, the construction arrangement of this invention arose from a project to provide a companion indoor unit for an electric heat pump particularly adapted for use in northern climates, and one in which attention is particularly paid to obtaining higher efficiencies in the heating mode of the unit. As there noted, one way in which to improve heating efficiencies is to locate the refrigerant compressor indoors.

The major components of a refrigerant circuit which can be located indoors for a heat pump are the compressor with external muffler, the indoor heat exchanger with a coil partitioning solenoid valve is used, the expansion and reversing valves, the suction line accumulator and the filter dryer. Also required for an indoor unit are the air mover, the supplementary resistance heat package normally provided for a northern climate heat pump, and the control system plus the electrical components associated with the heat package. Further, to obtain high efficiency operation for the indoor unit as a whole, the air mover contemplated is a centrifugal blower with backward inclined blades equipped with a special inlet and outlet arrangement, as distinguished from the typical forward curved vane centrifugal fan. Such a blower takes more space than the conventional squirrel cage blower.

Accordingly, it is the aim of the invention to achieve an optimum arrangement or packaging of these components in an indoor unit. Such an optimum packaging might best be defined as that arrangement which most completely satisfies, to the best of our knowledge, the combined requirements of excellent thermal-mechanical performance, economic manufactureability, easy maintainability and good marketability. The arrangement should also be such as to provide flexibility of mode of installation since there exists a wide variety of locations within the typical dwelling where the unit might be sited.

The indoor unit of this invention is considered to satisfy such requirements.

SUMMARY OF THE INVENTION

In accordance with the invention, the indoor unit is of a modular construction including two basic independent modules, the first constituting the refrigertion module including an indoor heat exchanger oriented in a particular disposition, the refrigerant compressor, and the entirety of the refrigerant circuit and components associated with the indoor unit, while the second module constitutes the air mover module having a blower arranged therein in a way in which the second module may be connected to the first module in air flow communication in a number of different ways. Further, the compressor is located relative to the coil such that when the connections between the first and second modules provide preferred air flow paths, the compressor heat dissipation is most effectively utilized, irrespective of whether the heat pump is operating in a heating or a cooling mode.

DESCRIPTION OF THE PREFERRED EMBODIMENT

Figure 1:
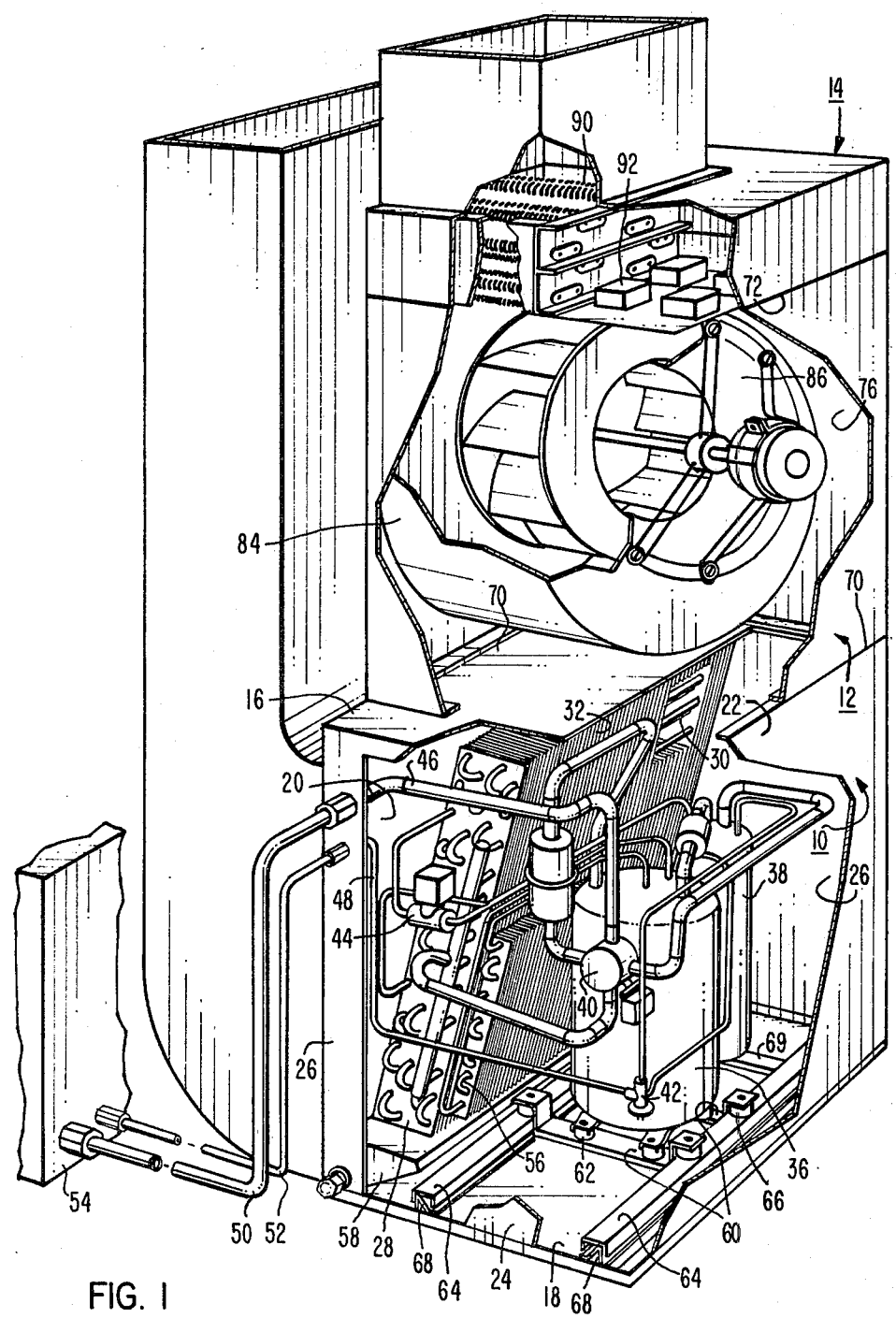
FIG. 1 is a partly broken isometric view of the indoor unit arrangement along with a fragmentary view of a part of the outdoor unit.
Figure 3:
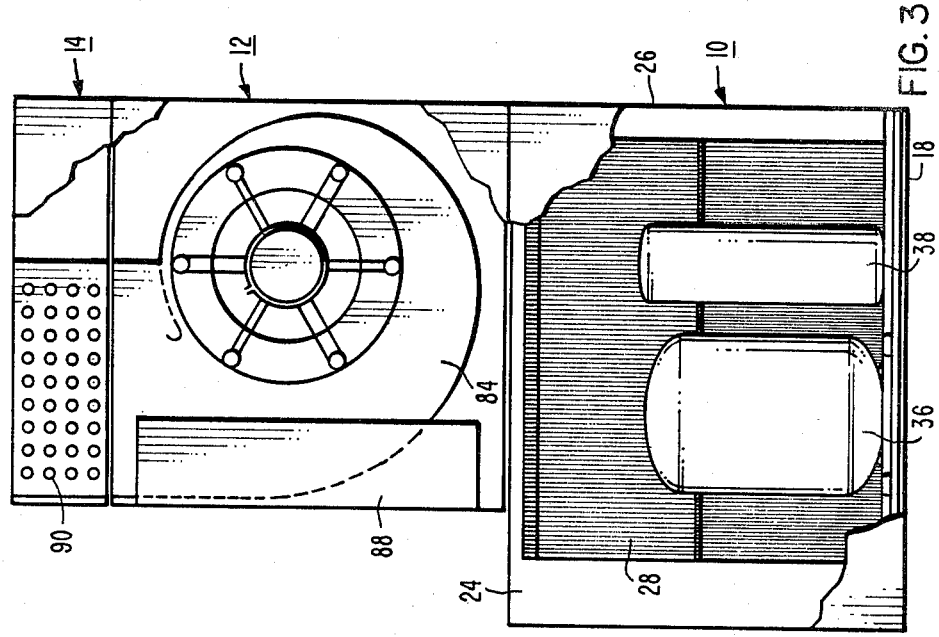
FIG. 3 is another elevation view, mostly in outline, at a right angle to that of FIG. 2.
Figure 2:
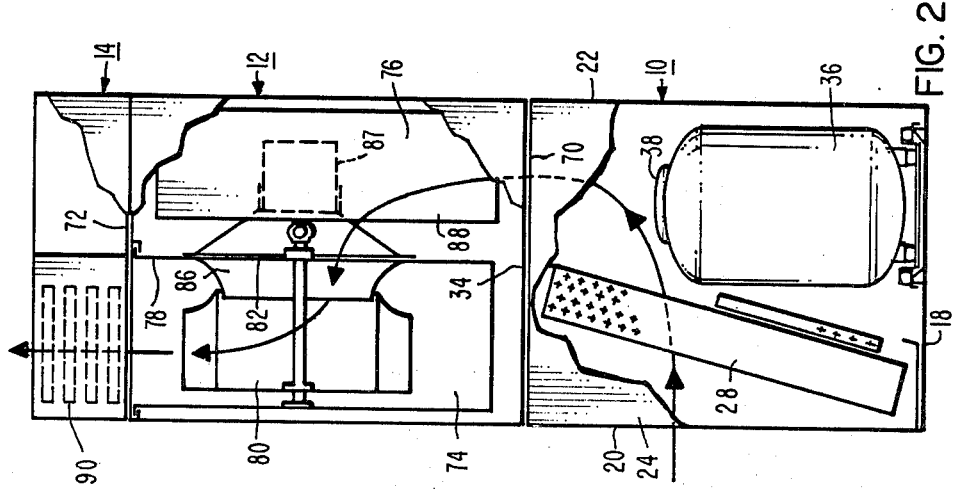
FIG. 2 is an elevation view with the main parts of the unit shown in outline.
Figure 4:
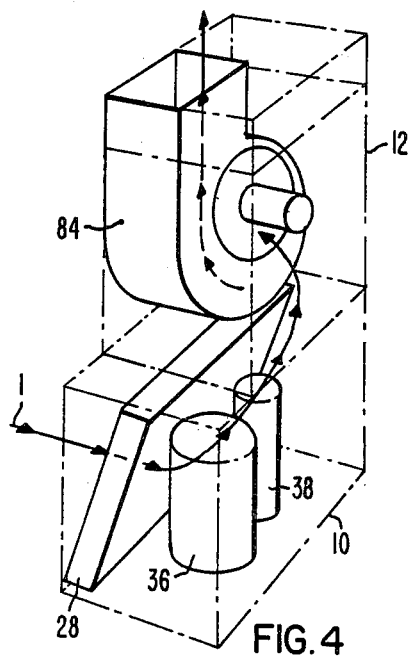
FIGS. 4 through 7 are outline views showing four alternative arrangements for connecting the modules in different ways.

Referring to FIGS. 1-3, the indoor unit includes a first independent module 10 which contains all of the components of the refrigeration circuit which is indoors, a second independent module 12 which contains the air mover, and a third module 14 containing the electrical resistance heating means, and which, in the currently preferred embodiment, is in a module separate from the air mover module 12.

The first module 10 has a generally parallelopiped exterior cabinet comprised of top and bottom faces 16 and 18, one and opposite longitudinal faces 20 and 22, and one and opposite lateral faces 24 and 26. The first or refrigerant module 10 contains a refrigerant coil 28 of the fin and tube type in which the tubes of the coil extend horizontally, and the fins 32 on the tubes 30 are disposed with their planes in a substantially vertical orientation. The coil 28 extends longitudinally with the module and, as is best seen perhaps in FIG. 2, has its lower longitudinal edge adjacent one lower longitudinal corner of the module, and is tilted inwardly to a degree that its upper longitudinal edge is near the midpoint 34 of the lateral dimension of the first module. This results in not substantially disparate area air passages from the first module to the second module, depending upon the air flow path selected.

In addition to the coil 28 and the refrigerant module 10, the module contains the remainder of the components of the refrigerant circuit associated with the indoor unit. These components include the refrigerant compressor 36, a suction accumulator 38, the reversing valve 40 as is conventional with heat pumps, the expansion device in the form of an electrically operated expansion valve 42, a coil circuit partitioning valve 44, and the various interconnecting refrigerant pipes between these elements and which are not specifically identified by numerals except for the two conduits 46 and 48 adapted to be connected to the lines 50 and 52, respectively, leading to the outdoor unit 54.

In the currently-preferred form of the indoor unit, the oil for lubricating the refrigerant compressor is preferably cooled externally to the compressor by heat exchanger 56 in an arrangement as disclosed in U.S. patent application Ser. No. 447,927, filed Dec. 9, 1982. A drain pan 58 underlies the coil and is connected to dispose of condensate exterior of the module.

The compressor is mounted upon what is herein termed first and second frame means to provide vibration isolation. The first frame means comprises two laterally extending bars 60 to which the feet of the compressor are mounted through vibration isolators 62. The first frame means is in turn mounted upon the second frame means which comprises two longitudinally extending inverted channels 64 through vibration isolators 66. The second frame means is longitudinally slidable upon longitudinally extending rails 68 supported from the base of the first module. The accumulator 38 is mounted through another vibration isolator (not shown) to a single lateral bar 69 which also is connected to the second frame means at its ends.

If the compressor is to be removed for service or repair, the end access panel 24 covering the one lateral face of the module is removed. The refrigerant lines 46 and 48 are cut, along with any refrigerant line extending to the coil. These refrigerant lines are readily accessible for severing and subsequent reconnection. The first and second frame means is then slid out the access end of the module along with the external oil cooler 56 carried by the second frame means, along with all the other parts carried by the frame means. The second frame can be configured easily to extend under and support the heat exchanger coil 28 so that upon parting lines 46 and 48 above, the entire intervals of the refrigeration module can be slid out for service.

It is to be noted that by simply removing the end panel 24, clear access is given to the reversing valve 40, the coil partitioning valve 44, the expansion valve 42, so that service to these items may be readily made. The return bends on the heat exchanger 28 are also exposed by removing the end panel 24.

The second, or air mover module 12 is also of generally parellelopiped exterior shape and has a lateral dimension substantially the same as the lateral dimension of the first module. The air mover has an inlet face 70 which is open, and is at its bottom in the disposition of the unit as shown in FIGS. 1-3. In the same Figures, its top face is the outlet face 72. The interior space of the second module is substantially split laterally into a first space 74 and a second space 76 by partition means 78 and a single width, single inlet blower 80 is located in the first space and has its inlet 82 open to the second space 76. In the preferred form, the blower has backwardly curved blades and is mounted in an involute spiral scroll 84 and the inlet 82 is defined by a bell mouth part 86. The second space 76 also accommodates the blower motor 87 and an electrical control components box 88 which contains parts such as an auto transformer, capacitors, fuses, contactors and relays.

In the currently-preferred form, the supplementary electric heat package 14 is in the form of a separate module and is attached to the outlet face 72 of the blower module 12 with the resistance heating elements 90 located in a duct section part of the module 14 which is in effect a continuation of the blower discharge plenum. The relays 92 for energizing the resistance elements are located in the other part of the module 14.

The alternative air flow paths which are available with the modular arrangement and with the blower module 12 connected in air flow communication with the refrigeration module 10 in various ways are shown in FIGS. 4–7. The preferred air flow paths are those shown in FIGS. 4 and 6 in which the return air to the unit passes first over the heat exchanger 28 and then past the compressor 36 before passing to the blower module 12.

The various air flow paths into the refrigerant module 10 are indicated by the dash line arrows in FIGS. 4 through 7 carrying the numerals 1 through 5. The most preferred air flow path is identified by the numeral 1 in which the air enters the refrigeration module 10 through the one longitudinal face, then passes through the heat exchanger 28 and past the compressor 36 in its passage to the inlet of the blower. The other air flow path in which the air passes through the heat exchanger and then past the compressor is identified by the numeral 5 in FIG. 6, in this case, the air descending down through the top face 16 in its entry to the refrigeration module 10.

Figure 5:
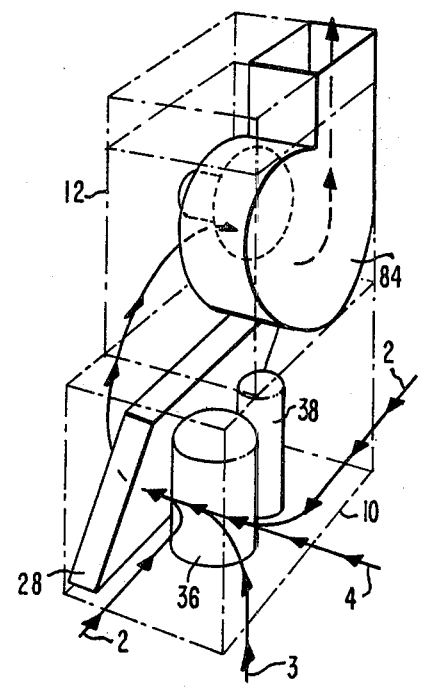
Figure 7:
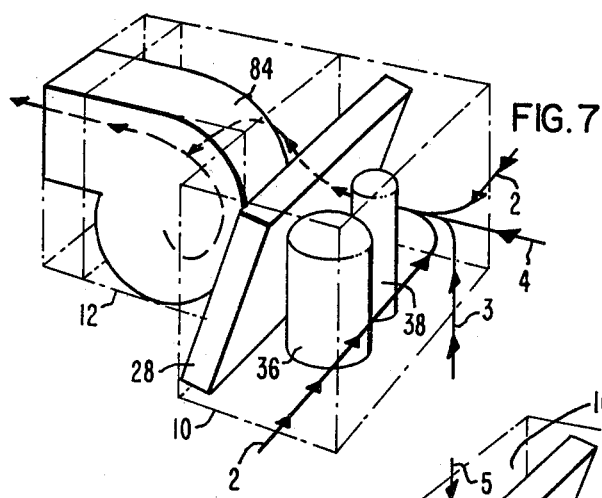
Figure 6:
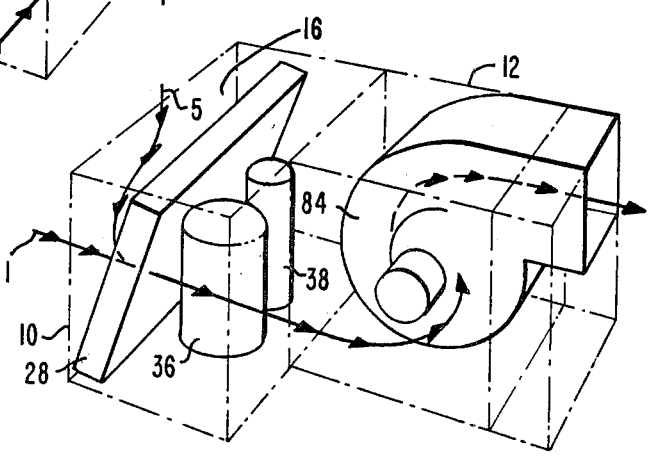

The other three entry paths to the refrigeration module are indicated by the numerals 2–4 and are shown in FIGS. 5 and 7. The paths 2 have the air entering the module through either of the lateral faces 24 and 26. The path 3 provides for the air to enter the module through its bottom face 18, while the path 4 has the air entering the module through the opposite longitudinal face 22.

Those faces of the first module which are adapted to be placed in abutting relation with the inlet face of the second module, as those faces which are, in part at least, to serve as air inlet openings to the first module, are provided with knockout sections or detachable panels, as is conventional in the art.

Figure 8:
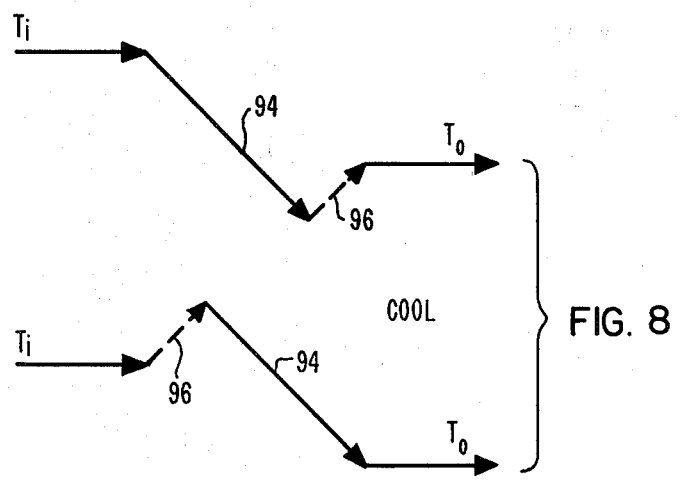
FIG. 8 comprises two graphs illustrating the advantage to be obtained in the cooling mode with the compressor downstream of the indoor heat exchanger.
Figure 9:
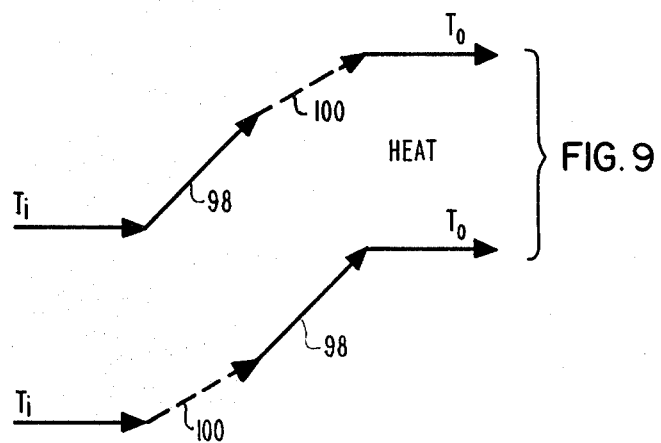
FIG. 9 comprises two graphs illustrating the advantage obtained with the compressor downstream of the indoor heat exchanger in a heating mode.

The reasons that the preferred air flow path is first over the coil and then past the compressor, in both the cooling and heating modes of operation of the heat pump, are perhaps best perceived from the graphs of FIGS. 8 and 9. In FIG. 8, both of the lines 94 indicate the extent of cooling provided by the coil to obtain the temperature out ($T_o$) with the given air temperature in ($T_i$). The dash lines 96 indicate heating from the compressor. The upper curve in FIG. 8 shows that with the compressor heat being added downstream of the coil cooling, the coil must cool to a temperature below $T_o$ in order to compensate for the reheat effect of the compressor. This reduced temperature of the coil enhances the dehumidification obtained from the coil. In the case of the air flow path being past the compressor before it goes through the coil, the lower curve of FIG. 8 shows that the air temperature is first heated, and the cooling effect of the coil descends only to $T_o$; not below that temperature.

FIG. 9 demonstrates the difference in the heating cycle when the compressor is downstream or, alternatively, upstream, of the coil. The line 98 in both instances indicates the heating by the coil, while the dash line 100 indicates heating by the compressor. The upper curve shows that with the compressor downstream of the coil, the coil heats air which enters it at a temperature of $T_i$ with the compressor heat being added to the air after the coil heat, to obtain a final temperature of $T_o$. In the case of the lower curve of FIG. 9, the compressor heat is first added to the air at a temperature $T_i$ so that the differential between the temperature of the coil and the air being heated by it is not as great as in the case of the upper curve. Accordingly, it will be appreciated that in both the heating and cooling modes, the provision of the air path through the coil first and then past the compressor is the preferred arrangement.

A number of advantages accrue from the unit design described. The provision of the compressor, and all of the indoor refrigerant circuit components in the one module, results in a compact refrigerant circuit with relatively low pressure drop. The provision of the indoor refrigerant circuit in the one module also permits the connections to be made by the lines 50 and 52 between the indoor and outdoor unit with only two connections at the outdoor unit and two connections at the indoor unit. This is advantageous as contrasted to those heat pumps having a compressor located indoors but in a separate module from the heat exchanger coil, and in which arrangement a total of six connections must be made.

Since the indoor unit is an integral part of the air circulation system of the dwelling, low noise level is important from an owner comfort viewpoint. The double vibration isolation of the compressor in the module tends to minimize conduction of vibrations to the frame and panels of the module and accordingly reduces potential noise levels.

The basic parallelopiped shapes of the modules yields low sheet metal fabrication cost by avoiding special tooling for complex shapes.

The multiplicity of air flow paths available as shown in FIGS. 4–7 by rearranging the air flow module 12 relative to the refrigeration module 10 results in good flexibility of placement of the indoor unit.

Good access to the refrigerant components such as expansion valve, reversing valve and coil partitioning valve is obtained by locating these elements close to the refrigerant circuit module access panel 24 at the one lateral end of the module. This is considered important since these valves have electrical components, such as heat motors and solenoids and as such are more subject to failure than most circuit components.

Mounting the compressor and the other major circuit components upon the slide-out frame arrangement gives good access to these components should service be required.

We claim:

1. An indoor unit of an electric heat pump, comprising:

first and second independent modules adapted to be connected in air flow communication in several different ways;

said first module being of right parallelopiped exterior form having a top face, bottom face, one and an opposite longitudinal faces, and one and an opposite lateral faces, and containing therein a refrigerant coil comprised of horizontally extending tubes and fins thereon disposed with their planes in a substantially vertical orientation, said coil extending longitudinally of said module and having its lower longitudinal edge adjacent one lower longitudinal corner of said first module, said coil being tilted inwardly to a degree that its upper longitudinal edge is adjacent the midpoint of the lateral dimension of said first module, said first module further containing a refrigerant compressor in the space adjacent the inner face of said coil;

a second module of right parallelopiped exterior shape having an inlet face and an outlet face, and a lateral dimension substantially the same as the lateral dimension of said first module, the interior space of said second module being substantially split laterally into a first space and a second space, said first space containing a single width, single inlet blower having its inlet open to said second space and its outlet open at said outlet face;

said second module being adapted to be mounted upon said first module in one position in which said blower is above said coil and air flow through said modules is in a sequence through said one longitudinal face of said first module, said coil and past said compressor to said blower inlet and, alternatively, mounted in another position 180° from said one position and in which said blower overlies said compressor and air flow through said module is in sequence through either of said lateral faces or said bottom face or said opposite longitudinal face, past said compressor, and through said coil to said blower inlet.

2. A unit according to claim 1 wherein:

said second module further being adapted to be connected to said first module in a third position in which said inlet face of said second module abuts said one longitudinal face of said first module and air flow through said modules is in a sequence through said bottom face or said opposite longitudinal face, past said compressor and through said coil to said lower inlet and, alternatively, connected to said first module in a forth position in which said inlet face abuts said opposite longitudinal face and air flow through said modules is in a sequence either through said top or one longitudinal face and said coil and past said compressor to said lower inlet.

3. In a unit according to claim 1 including:

first and second frame means;

means mounting said compressor in vibration isolation relation to said first frame means;

means mounting said first frame means in vibration isolation relation to said second frame means;

rail means extending longitudinally in said first module carrying said second frame means in slidable relation to permit removal of said compressor and first and second frame means through a lateral face of said first module.

4. A unit according to claim 3 including:

a refrigerant accumulator mounted to said second frame means through vibration isolation means.

5. For an electric heat pump having an outdoor unit, and wherein the indoor unit comprises:

first and second independent modules adapted to be connected in air flow communication;

said first module being of right parallelopiped exterior form having a top face, bottom face, one and opposite longitudinal faces, and one and opposite lateral faces and containing therein a refrigerant coil comprised of horizontally extending tubes and fins thereon disposed with their planes in a substantially vertical orientation, said coil extending longitudinally of said module and having its lower longitudinal edge adjacent one lower longitudinal corner of said first module, said coil being tilted inwardly to a degree that its upper longitudinal edge is adjacent the midpoint of the lateral dimension of said first module, said first module further containing a refrigerant compressor in the space adjacent the inner face of said coil, said first module also containing reversing valve means, expansion valve means, a refrigerant accumulator, and interconnecting refrigerant piping therebetween so that all the indoor refrigerant circuit elements are in said first module and the refrigerant connections between said first module and said outdoor unit consist of two pipes only; and said second module containing blower means for drawing air from said first module, and being connected to said first module in a disposition to draw air through said coil first and then past said compressor in both heating and cooling modes of operation of the heat pump.

6. For a heat pump according to claim 5 including:

frame means carrying said compressor in vibration isolation relation thereon; and said means supporting said frame means in slidable relation.

* * * * *